Sept. 6, 1960 M. SEYMOUR 2,951,305
METHOD OF DULLING A POLYETHYLENE TEREPHTHALATE FILM SURFACE
Filed Nov. 28, 1956

INVENTOR
Malcolm Seymour
BY McCoy, Greene + Te Grotenhuis
ATTORNEYS

United States Patent Office 2,951,305
Patented Sept. 6, 1960

2,951,305
METHOD OF DULLING A POLYETHYLENE TEREPHTHALATE FILM SURFACE

Malcolm Seymour, North Andover, Mass., assignor to The General Tire & Rubber Company, Akron, Ohio, a corporation of Ohio Filed Nov. 28, 1956, Ser. No. 624,868

4 Claims. (Cl. 41—39)

This invention relates to a process of treating and particularly abrading the surface of polyethylene terephthalate film so as to improve its appearance.

Polyethylene terephthalate film is an outstanding facing for laminated plastic sheet material used as wall covering, shelf covering, and the like because of its transparency, relative insensitivity to moisture, resistance to solvent and chemical attacks, dimensional stability and high tear and tensile strength.

In many applications, however, it is not desirable because of its reflective and shiny surface.

A warmer, deeper looking surface is desired in order to bring out the design in the layer underneath the polyethylene terephthalate film.

The object of the present invention is to provide a process of treating polyethylene terephthalate film so that the surface is abraded or dulled without adversely affecting its physical properties and resistance to solvent and chemical attacks.

Other objects will be apparent from the specification and claims and in the drawings in which:

In accordance with the present invention, I have discovered a process of dulling the surface of polyethylene terephthalate film which comprises the application thereto of a rotating brush with a light stroking technique using a minimum of pressure. The brush must have bristles of a certain yieldability and flexibility, such as that of crimped steel bristles having a diameter of about 0.002 to 0.005 inch, so that a plurality of slight abrasions are provided on the film surface and yet it is not ripped or scarred.

The resultant film has a non-reflective surface comprising a plurality of upstanding irregular land portions and undercut indentations or grooves which are formed by the bristles of the brush. The ends of the brush bristles gouge out fine slivers of material from the surface of the film to form these indentations.

Figure 1:
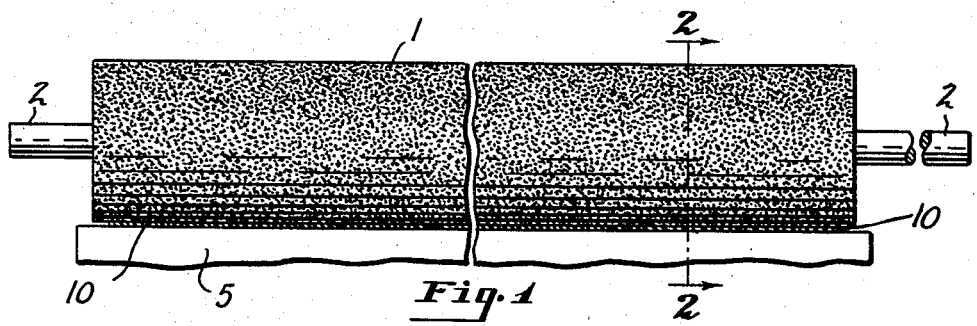
Figure 1 is a fragmentary front elevational view of an apparatus which may be used to delusterize a polyethylene terephthalate film surface in accordance with the present invention and showing in section of magnified thickness a film in position.

Referring to the drawings, Fig. 1 shows a wire brush 1 rotatably mounted on a shaft 2 which is located above a backing roll 5 so that a plastic laminated article 10 is supported by the backing roll while passing under the wire brush.

Figures 2, 3:
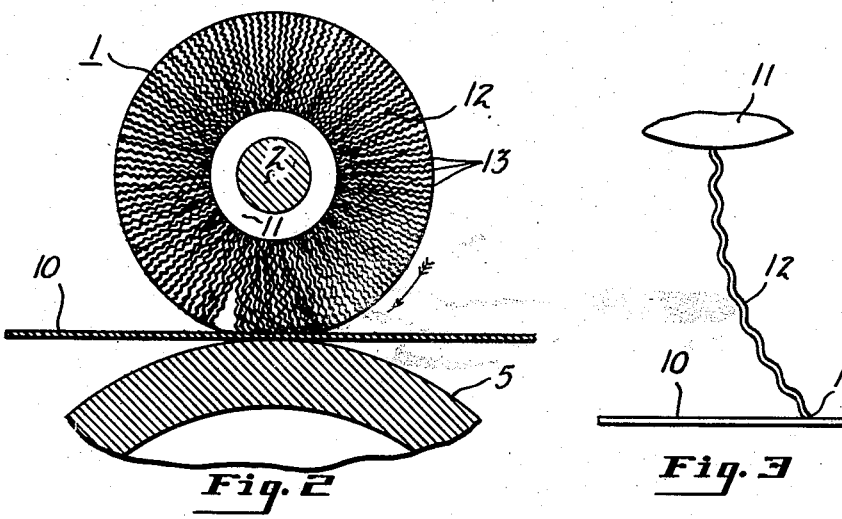
Figure 2 is a fragmentary sectional view taken on the line indicated at 2—2 in Fig. 1 and on an enlarged scale.
Figure 3 is a fragmentary view of a crimped wire bristle which is preferably used in apparatus accomplishing the invention. The bristle is shown on an enlarged scale.

As best shown in Figs. 2 and 3, the brush has an interior cylindrical section 11 to which individual bristles 12 are anchored and from which section the bristles extend radially so that the bristle tips 13 form the outer periphery of the brush.

Figure 4:
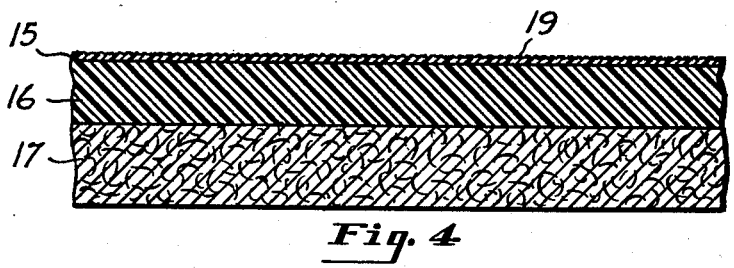
Figure 4 is a fragmentary sectional view of a plastic laminate with a polyethylene terephthalate surface which has been dulled in accordance with the present invention.
Figure 5:
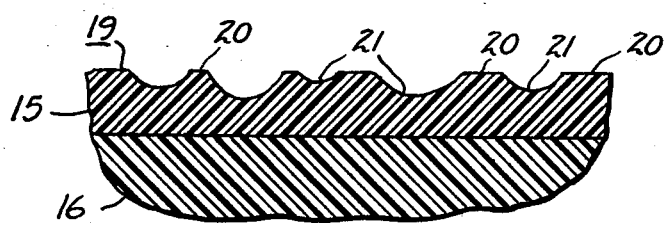
Figure 5 shows a fragmentary sectional view of the film layer which has been dulled and delusterized according to the present invention, and shown on an enlarged scale.

The plastic laminate 10, as best seen in Figs. 4 and 5, has an upper layer 15 of polyethylene terephthalate film, a lower layer 16 of plasticized polyvinylchloride film, and preferably a paper backing layer 17 adjacent the polyvinylchloride layer 16.

Polyethylene terephthalate film is better known as Mylar, a trademark of E. I. du Pont de Nemours & Co. (Inc.) of Wilmington, Delaware.

It is a polyester of a very high molecular weight (above 10,000) and is formed from the reaction of about equal moles of ethylene glycol and terephthalic acid. The Mylar layer is made by stretching a film of the polyester in two substantially perpendicular directions to provide a characteristic X-ray diffraction pattern.

The ends or tips 12 of the bristles are preferably sharpened by rotation against an abrasive cloth so that they are able to gouge the surface cleanly. As best shown in Fig. 5, the surface 19 of the dulled polyethylene terephthalate layer should have a plurality of upstanding land portions 20 and a plurality of undercut indentations or valleys 21. Turned-up furrows of material which result from the plowing action of conventional brushing treatment are not desirable in that they leave a milky opaque surface.

It is important that the hardness and flexibility of the wire bristles 12 be at least as much as that of German silver or crimped steel. Bristles that are of a softer material than German silver have little effect on the film surface. Bristles that are of a harder and stiffer material tend to tear the surface or plow a furrow therein and leave upturned edges. This leaves a white haze which is particularly undesirable on dark colors such as blue, black and red. I have found that the hardness of the bristle material preferably should be of the order of the hardness of German silver which is somewhere between the hardness of soft copper and soft nickel. The material preferably should have a Brinell hardness number not substantially less than about 50 and not substantially greater than about 100. When harder materials, such as steel, are used, they should be crimped and the angle of attack on the film surface should be increased so as to have a softer brushing action.

The manner of applying the tips 13 of the bristles to the Mylar surface 19 is important. If the bristles are not bent or flexed slightly but are substantially straight when the ends abrade the surface, the ends actually rip into the surface instead of dulling it. A wiping action is required in which the bristle is bent or deflected near the tip.

When the bristle tip first contacts the surface, an angle of preferably about 15 to 35 degrees should be formed at the tips of the bristle between the longitudinal axis of the bristle and an angle normal to the Mylar surface. This deflection of the bristle from an angle normal to the surface provides a wiping action which dulls, rather than rips, the surface. The pressure between the brush and the abraded Mylar should be in the order of 5 to 30 pounds per square inch.

The Mylar layer, before it is dulled, may be from about 0.0001 to .007 inch in thickness although the preferable thickness is about .0002 to .0015 inch.

The diameter of the wire bristle is preferably slightly greater in dimension than the thickness of the polyethylene terephthalate layers being abraded. Since the wire generally has a diameter at least as great as the depth of the polyethylene terephthalate layer especially when the preferred thickness of the layer is used, a wiping action is desired to cut the surface to form the upstanding lands and valleys cleanly rather than rip the layer. As previously described, the ends of the bristles preferably are sharpened by rotating the brush with the bristle against an abrasive surface so as to form a tip with relatively small burrs of material thereon which apparently aid in the undercutting of indentations so as to leave clean cut valleys in the layer rather than a roughly-cut plowed-up valley of irregular outline which would render a hazy opaque appearance to the surface.

The following examples illustrate my invention:

*Example I*

A 0.016 inch thick sheet of polymerically plasticized polyvinyl chloride base compound was covered with a thin hard transparent layer of Mylar which was 0.001 inch thick. The two layers were bonded by a suitable cement. The other surface of the polyvinyl chloride sheet was bonded to a 0.030 inch thick paper layer to provide a laminated plastic sheet.

A wire brush with an average diameter of 5 inches and having a core and 1½ inch long crimped steel bristles attached thereto was mounted in a drill press and rotated at 2800 revolutions per minute. The bristles were .0035 inch in diameter and were of a rigidity insufficient to destroy the film of polyethylene terephthalate but sufficient to cut grooves therein.

The Mylar surface of the laminated sheet was brought into contact with the tips of the bristles and was forced inward about ⅛ inch toward the core of the brush so as to brush the sheet with a gentle stroking action from the slightly deflected bristles. The Mylar surface was examined and found to be uniformly dulled and non-shiny in nature. The surface contained a plurality of slight abrasions.

The surface was satisfactorily dulled when the sheet was moved in at least about 1/32 of an inch up to ¼ inch although some chatter marks were obtained at ¼ inch in the direction of the core.

When bristles of 0.002, 0.003, and 0.004 and 0.005 inch diameter were used in place of the 0.0035 inch diameter bristles, the surface was also satisfactorily dulled.

*Example II*

A sheet was prepared as in Example I and its Mylar surface satisfactorily dulled with a 5" diameter brush having 1 inch crimped steel bristles of a 0.0025 inch diameter. The brush was rotated at 1750 revolutions per minute. Again a stroking technique was employed with a minimum of pressure so that the bristles are under a slight deflection. One pass with the brush was found to dull the surface although one or two additional passes provided an even more uniformly dulled and non-shiny surface.

The major benefits of this invention may be obtained with brush peripheral speeds equivalent to those of 5 to 7 inch diameter brushes rotated at speeds of 1500 to 3500 revolutions per minute. Larger diameter brushes may also be used when the angle of attack and velocity along the film surface is of the same order as provided above. The rigidity of the bristles may be greater when thicker films of Mylar are used than when thinner films are used without cutting through the film. The thickness of the useful bristles and their resistance to bending out of the peripheral surface of the brush a given amount is, of course, a function of bristle length. A thickness-to-length ratio that makes the bristle of insufficient rigidity to destroy or cut through the film but sufficient rigidity to cut grooves should be used. The bristles should generally be readily flexible and yieldable and be of a material with cantilever resistance to bending no greater than that of straight .0035 inch diameter spring steel wires having a length of two inches and having the following amounts of alloying agents:

| | Percent |
|---|---|
| Carbon | 1.01 |
| Magnesium | 0.38 |
| Phosphorous | .032 |
| Sulfur | .032 |
| Silicon | 0.13 | and hardened by quenching in oil at 1450° F. Preferably the bristles have a diameter within the range of .0030 to .0045 inch and a length of about 1 to 3 inches in crimped state. Wires of other metals having the desired yieldability and flexibility may be used, such as German silver or nickel silver.

When non-crimped steel wire bristles and Tampico fibre bristles were substituted for the crimped steel bristles of Example I, the Mylar coating was ripped, perforated and otherwise mutilated even though the substituted bristles had a diameter within the range of .0030 to .0045 inch.

The polyvinyl chloride backing compound described in Example I may be substituted for by other plastic sheet or film backing compositions used in Mylar laminates such as polyurethane, polyethylene, polyvinyl acetate, and polystyrene or copolymer thereof. However, the preferable backing compounds are polyvinyl chloride, polyvinyl chloride-acetate copolymers the major portion of which is vinyl chloride and polyvinylidene chloride.

It will be understood that the above description is by way of illustration rather than of limitation and that, in accordance with the provisions of the patent laws, variations and modifications of the specific articles and process disclosed herein may be made without departing from the spirit of the invention.

Having described my invention, I claim:

1. A process for dulling the surface of a relatively flat laminated plastic sheet having a hard transparent surface layer of a polyethylene terephthalate thereon with a thickness of .0002 to .0015 inch, comprising the steps of brushing said surface and removing polyethylene terephthalate material therefrom with a rotating brush having a center cylindrical core and a plurality of .0030 to .0045 inch diameter flexible wire bristles of a hardness of between 50 and 100 Brinell scale and a length of 1 to 3 inches connected around the peripheral portions thereof, said sheet being disposed inward toward the center of said brush core about 1/64 to ½ inch so that said bristles are slightly bent while in contact with said sheet, and thereafter removing the sheet to leave the surface of the transparent layer with a plurality of slight clean abrasions.

2. A method as defined in claim 1 in which the wire bristles are made of crimped steel.

3. A process for dulling the surface of a flat laminated plastic sheet having a relatively thin hard transparent lustrous surface layer of oriented polyethylene terephthalate with a thickness of .0002 to .0015 inch bonded to a relatively thick flexible layer of polyvinyl chloride comprising the steps of adhering the sheet to a paper backing layer, feeding the sheet between an externally cylindrical rotating backing roll and an externally cylindrical rotating wire brush parallel to said roll having cutting elements consisting of flexible radial wire bristles with a hardness between 50 and 100 Brinell scale, a diameter of about .003 to .0045 inch, and a length of about 1 to 3 inches, and simultaneously forming a multiplicity of marginally flat, clean cut grooves in the surface portion only of the polyethylene terephthalate layer without plowing turned up furrows by brushing the dry hard lustrous surface of the moving sheet with the periphery of the rotating wire brush while applying a pressure of 5 to 30 pounds per square inch so as to remove material from the lustrous surface and provide an attractive dulled surface.

4. A process as defined in claim 3 wherein said surface layer has a thickness of about .001 inch and said bristles are made of crimped steel.

References Cited in the file of this patent

UNITED STATES PATENTS

| | | |
|---|---|---|
| 2,483,584 | Lesavoy | Oct. 4, 1949 |
| 2,637,929 | Hausman | May 12, 1953 |
| 2,674,558 | Neugass | Apr. 6, 1954 |
| 2,684,922 | Pollock | July 27, 1954 |